(12) United States Patent
Vargo et al.

(10) Patent No.: US 7,094,456 B1
(45) Date of Patent: Aug. 22, 2006

(54) HYBRID LINERS HAVING REDUCED ADHESION TO AN UNVULCANIZED RUBBER MATERIAL

(75) Inventors: Richard David Vargo, Cuyahoga Falls, OH (US); Charles Terry Huffstetler, Union City, TN (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/719,023

(22) PCT Filed: Jun. 1, 1998

(86) PCT No.: PCT/US98/11069

§ 371 (c)(1),
(2), (4) Date: Oct. 30, 2003

(87) PCT Pub. No.: WO99/62695

PCT Pub. Date: Dec. 9, 1999

(51) Int. Cl.
*B32B 3/10* (2006.01)

(52) U.S. Cl. .......................... 428/61; 428/58; 428/906; 206/412

(58) Field of Classification Search .................. 428/58, 428/60, 61, 54, 906; 242/160.4, 530.2; 206/412
See application file for complete search history.

(56) References Cited

U.S. PATENT DOCUMENTS

| 1,543,283 | A |   | 6/1925 | Falor et al. |
| 2,067,667 | A |   | 1/1937 | Keller .......................... 154/43 |
| 2,460,343 | A | * | 2/1949 | Foster ............................ 38/63 |
| 2,541,498 | A |   | 2/1951 | Calvert ........................ 206/59 |
| 4,006,051 | A |   | 2/1977 | Board, Jr. .................... 156/247 |
| 5,004,635 | A |   | 4/1991 | Griebling ..................... 428/33 |
| 5,612,107 | A |   | 3/1997 | Sangani et al. ............. 428/41.7 |
| 6,187,126 | B1 | * | 2/2001 | Rothrum et al. ............ 156/200 |

FOREIGN PATENT DOCUMENTS

WO         WO 90/08708      *   8/1990

* cited by examiner

*Primary Examiner*—Alexander S. Thomas
(74) *Attorney, Agent, or Firm*—Brouse McDowell; Roger D. Emerson; Heather M. Barnes

(57) ABSTRACT

A hybrid liner (40) and system for using a hybrid liner includes a first portion (42) being made of one material and a second portion (44) being made of a separate material. The two materials have a different propensity for sticking to the unvulcanized rubber component (20) as well as a different cost. The invention concerns using the less sticky, more expensive liner in the areas of the liner roll where sticking is more likely to occur and using the less expensive material where liner to rubber adhesion is less of a problem.

7 Claims, 3 Drawing Sheets

SCHEMATIC DIAGRAM OF AN A-FRAME SUPPORT LINER

SCHEMATIC DIAGRAM OF A SURFACE WINDER SUPPORT LINER

HYBRID LINERS HAVING REDUCED ADHESION TO AN UNVULCANIZED RUBBER MATERIAL

This application is the national stage of parent application PCT/US98/11069 which has an international filing date of Jun. 1, 1998.

1. Technical Field

The invention pertains to the manufacture of articles utilizing tacky or sticky components, generally in strip or sheet form. One common application of the invention is in the tire manufacturing industry where unvulcanized elastomeric components are commonly extruded in strip or sheet form and are wrapped in liners until they are incorporated into the tire during the manufacturing process.

2. Background Art

It is known to store unvulcanized elastomeric tire components in liners. It is also known to manufacture liners of different materials, such as cotton and polyester.

U.S. Pat. No. 4,006,051 to Board, Jr. discloses a laminate liner to be secured to a supporting surface. The liner comprises, in combination, a backing sheet member characterized by a large number of holes, a fibrous, polymeric sheet material characterized by small holes, and a hardenable resin binder material. The resin binder material is impregnated into the openings of the backing member and the fibrous, polymeric sheet material is compressed into the openings of the backing member to conform an integral, unitary, laminate liner.

U.S. Pat. No. 5,612,107 to Sangani et al. discloses a composite construction which comprises a layer of plasticized polymer film, a release-coated liner, and a plasticizer-resistant polymer back coating on the other surface of the release coated liner B.

Nonetheless, improvements were desirable and are accomplished through the invention disclosed herein.

SUMMARY OF THE INVENTION

A liner for storing unvulcanized elastomeric materials includes a first end and a second end. The liner has a first portion extending from the first end of the liner to a first transition region in the liner. A second portion extends from the first transition region in the liner to the second end of the liner. The first portion of the liner is made of a first material and the second portion of the liner being made of a second material. Unvulcanized materials tend to stick to the first portion of the liner at a first propensity for sticking and tend to stick to the second portion of the liner at a second propensity for sticking, with the first propensity for sticking being different than the second propensity for sticking.

DISCLOSURE OF THE INVENTION

In the manufacture of several articles, among them the manufacture of tires, it is common to extrude or otherwise form unvulcanized elastomeric materials into strips or sheets for inclusion later in the manufacturing process. Often, these unvulcanized components are stored in the form of strips. Because the components are tacky or sticky, they are separated from each other by a layer of material. For example, strips of unvulcanized elastomeric components are commonly separated from each other by a liner.

A liner is essentially a long, rectangular piece of cloth or other planar member. Typically, the elastomeric strip is placed on the top surface of the liner and then one end of the liner/component combination is wound, thereby creating a spiral from a side view. For example, with reference to FIG. 1, a component and liner in the process of being rolled up into a spiral is illustrated.

Figure 1:
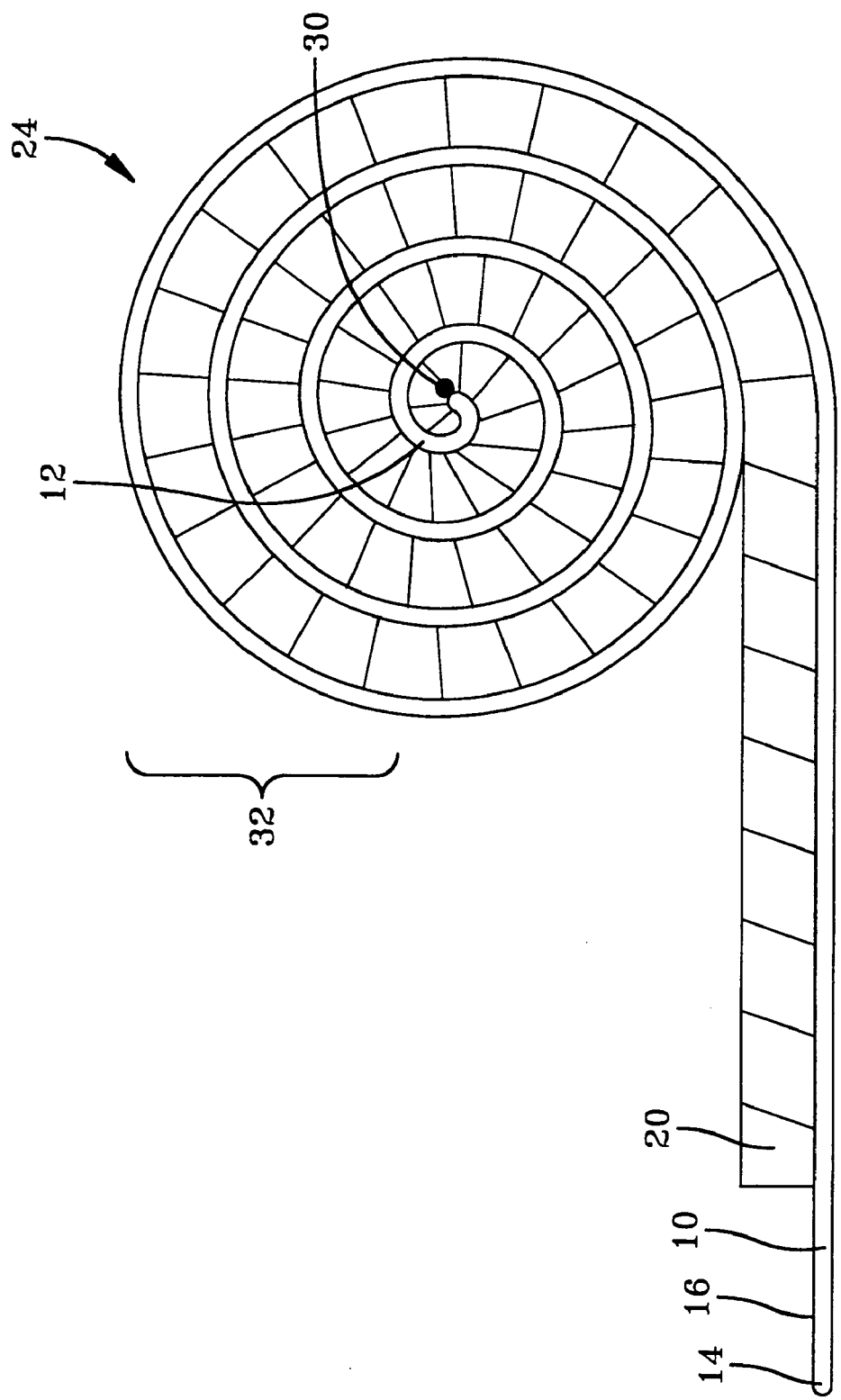
FIG. 1 is a schematic, side view of a liner 10, an elastomeric material 20 partially wound onto a roll 30. The liner 10 and elastomeric material 20 are shown larger that actual size in order better to show the invention.

With continuing reference to FIG. 1, a liner 10 includes a first end 12 and a second end 14. An associated elastomeric material 20 is placed upon an upper surface 16 of the liner 10. The liner 10 and elastomeric material 20 are shown in the process of being wound into a roll 24. From the side, as is illustrated in FIG. 1, the end view of the roll 24 resembles a spiral pattern, with the first end 12 of the liner 10 being at the center of the spiral and successive layers of liner 10 and elastomeric material 20 being wrapped around the first end 12 of the liner 10.

With continuing reference to FIG. 1, a problem commonly occurs when unvulcanized elastomeric material 20 is wound into rolls 24 as illustrated in FIG. 1. Typically, the roll 32 is suspended by some sort of cylindrical axis 30. As the diameter of the roll 24 increases, the weight of the elastomeric material 20 in the roll 24 can begin to crush the liner 10 and elastomeric material 20. Sometimes this crushing occurs in the upper portion of the roll 32. Usually the crushing occurs in the core of a roll of material 20 that is "center-driven", meaning it is rotated by applying a torque to the center of the roll 32. Other times the crushing occurs in the outside layers, as is common in a "surface wound" roll 32 of material. Sometimes this increased pressure works to increase the adhesion between the liner 10 and an elastomeric material 20 until an undesirable condition, sometimes known as "stuck-to-liner" occurs. The "stuck-to-liner" can be more accurately described as the occurrence of adhesion between the liner 10 and the elastomeric material 20 at such a high level that separating the liner 10 from the elastomeric material 20 at the tire building machine during the normal tire building process is difficult. In such cases, as a separate process, the elastomeric material is separated from the liner. Because the "stuck-to-liner" requires a separate separating process, production time is wasted as the tire manufacturing process is slowed down. All of the attendant costs necessary by adding an additional step, with additional equipment, and additional floor space, are added to the cost of the tire building process.

A related, but separate problem also stemming from the "stuck-to-liner" is that of an unvulcanized elastomeric component which has lumps within it. The lumps are due to prematurely cured or vulcanized rubber due to an excessive heat history. The cured lump of rubber can commonly occur from reuse of scrap inner liner material. This gives rise to the heat history.

The inventors having invented a system and a method of winding, unvulcanized, elastomeric materials into rolls 24 which greatly reduces the "stuck-to-liner" problem.

The inventors learned that a liner 10 manufactured from cotton cloth had significantly lower adhesion to an unvulcanized elastomeric tire component known as an inner liner. The inventors compared a cotton liner to a similar liner manufactured from polyester.

Figure 2:
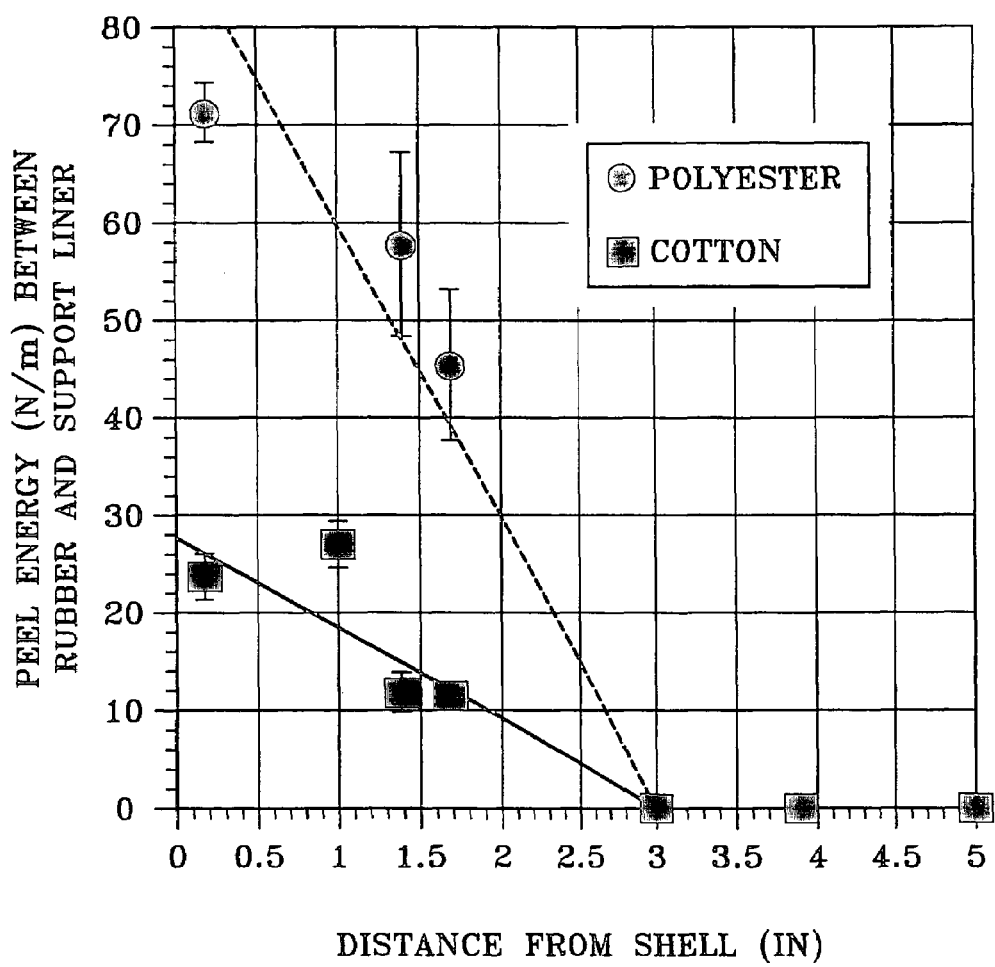
FIG. 2 is a chart illustrating certain technical data from tests on the invention.

With reference to FIG. 2, the inventors learned that the unvulcanized elastomeric inner liner component was significantly less likely to stick to a cotton liner. In FIG. 1, the propensity for sticking between the cotton liner and the unvulcanized elastomeric inner liner is illustrated by the squares on the chart while the propensity for the unvulcanized inner liner to stick to the polyester liner is demonstrated by the circles on the chart. In addition, the propensity to adhere is represented as a function of position within the roll 24.

As is clear from FIG. 2, the cotton liner provides better release characteristics. However, the cotton liner material is approximately four times the cost of the polyester liner. The inventors have discovered a way to provide better performance with respect to the "stuck-to-liner" problem while providing cost advantages previously unavailable.

Figure 3:
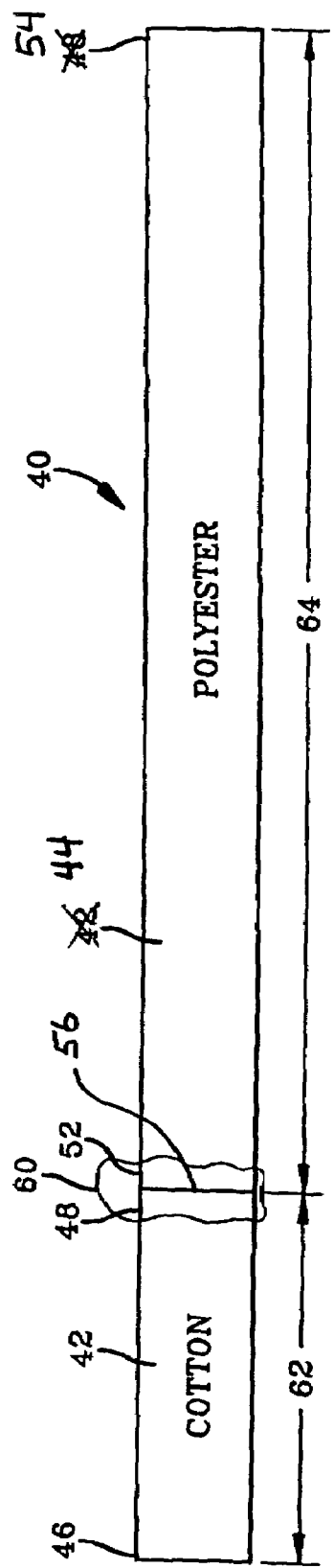
FIG. 3 is a schematic, plan view of one embodiment of the inventive liner 10.

With reference to FIG. 3, a hybrid liner 40 is disclosed. The hybrid liner 40 has a first portion 42 and a second portion 44. The first portion 42 has a first end 46 and a second end 48. The second portion 44 has a first end 52 and a second end 54. In the embodiment of the hybrid liner 40 shown in FIG. 3, the second end 48 of the first portion 42 is fixedly attached to the first end 52 of the second portion 44. In the preferred embodiment, the attachment is made by sewing the first portion 42 to the second portion 44, thereby creating a seam 56. The seam 56 is a line perpendicular to the longitudinal centerline CL of the hybrid liner 40. While this is the preferred embodiment of the hybrid liner 40, more elaborate designs may include a zone of transition 60. The zone of transition 60 might be a blend of the materials together, or it might be a diagonal straight line (one that is not generally perpendicular to the longitudinal centerline CL of the liner 40), or may be some sort of a curvilinear, non-liner line. While the zone of transition may be configured however the particular application requires, the preferred zone of transition for the hybrid liner 40 is a simple seam 56 which sews the second end 48 of the first portion 42 to the first end 52 of the second portion 44.

The first portion 42 of the hybrid liner 40 is made of cotton while the second portion 44 of the hybrid liner 40 is made of polyester. The elastomeric material 20 is wound onto the hybrid liner 40 so that the first end 46 of the first portion 42 is closest to the axis 30. In this way, the first portion 42 of the hybrid liner 40 is at the center of the roll 24, nearer the axis 30. Since it is the center portion of the roll 40 where the "stuck-to-liner" problem is most likely to occur, the first portion 42 of the hybrid liner 40 is made of the relatively expensive cotton material. The second portion 44 is made of polyester, as the second portion of the hybrid liner 40 will be nearer the outer layers of roll 24 where the "stuck-to-liner" problem is less likely to occur.

With continuing reference to FIG. 3, the length 62 of the first portion 42 is less than the length 64 of the second portion 44. Because of this difference in length, of course, cost savings accrue due to the invention.

The respective lengths 62, 64 should be adjusted with respect to each application. In the preferred embodiment, as applied by the inventors, the length 62 of the first portion 42 was 75 yards (68.6 meters) while the length 64 of the second portion 44 was 145 yards (132.6 meters).

Figure 4:
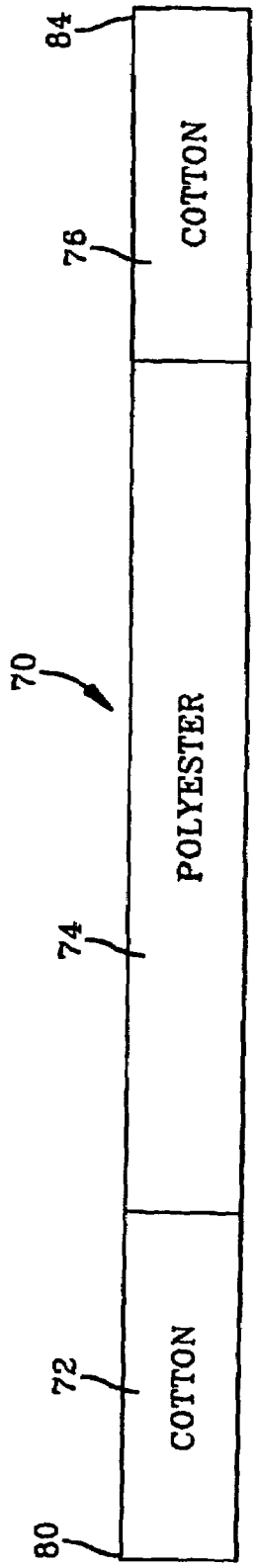
FIG. 4 is a schematic, plan view of a second embodiment of the inventive liner 10.

With reference to FIG. 4, a second embodiment of the invention is disclosed. The embodiment shown in FIG. 4 is especially suited for surface wound rolls. For example, if the roll 24 is to be mounted to an A-frame, a storage device for such rolls 24 which is commonly known in the art, the liners 10, 40 do not have to be rerolled after letting off on the tire machine and rolling up on the calender. As such, the cotton liner (the first portion 42) is only needed on one end of the hybrid liner 40. However, in a surface wound roll, unless the cotton liner is placed at each end of a hybrid liner, then the hybrid liner would have to be rerolled after letting off at the tire machine and rolling up on the calender. Therefore, in the embodiment illustrated in FIG. 4, a hybrid liner 70 has a first portion 72, a second portion 74, and a third portion 76. The operation and function of the third portion 76 is essentially identical to that of the first portion 42 illustrated in FIG. 3 and discussed above. The primary difference between the hybrid liner 70 shown in FIG. 4 and the hybrid liner 40 shown in FIG. 3 is simply that the hybrid liner 70 shown in FIG. 4 performs the desired advantages without the requirement of rerolling. In other words, a first end 80 of the first portion 72 can be affixed to the axis 30, or, a second end 84 of the third portion 76 can be affixed to the axis 30. The relative lengths of each of the first, second, and third portions 72, 74, 76 of the hybrid liner 70 are as described above regarding the hybrid liner 40.

Still other benefits and advantages of the invention will become apparent to those skilled in the art to which it pertains upon a reading and understanding of the following detailed specification.

What is claimed is:

1. A system comprising:
 a sheet of unvulcanized elastomeric material; and,
 a liner having a first end, a second end, a width, a length and a longitudinal centerline, the liner comprising:
  (a) a first portion extending from the first end of the liner to a first transition region in the liner, the first transition region being between the first end and the second end of the liner, the first portion having a length; and,
  (b) a second portion extending from the first transition region in the liner to the second end of the liner, the first portion of the liner being made of a first material and the second portion of the liner being made of a second material, the second portion having a length, wherein the first portion length is less than the second portion length, wherein the sheet of unvulcanized elastomeric material sticks to the first portion of the liner at a first propensity for sticking, and the sheet of unvulcanized elastomeric material sticks to the second portion of the liner at a second propensity for sticking, the second propensity for sticking being greater than the first propensity for sticking.

2. The system of claim 1 wherein the first portion is formed of cotton and the second portion is formed of polyester.

3. The system of claim 1 where the first transition region comprises a line generally perpendicular to the longitudinal centerline of the liner.

4. The system of claim 3 wherein the line is formed by sewing the first portion to the second portion.

5. The system of claim 1 wherein the sheet of unvulcanized elastomeric material and the liner are wound into a roll.

6. The system of claim 5 wherein the roll is center-driven.

7. The system of claim 5 wherein the roll is surface wound.

* * * * *